(12) United States Patent
Pixton et al.

(10) Patent No.: US 9,201,220 B1
(45) Date of Patent: Dec. 1, 2015

(54) DUAL FIELD OF VIEW OPTICS WITH NON-MECHANICAL SWITCHING

(71) Applicant: United States of America, as represented by the Secretary of the Army, Washington, DC (US)

(72) Inventors: Bruce M. Pixton, Woodbridge, VA (US); Jay N. Vizgaitis, Alexandria, VA (US); Russell S. Draper, Burke, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/532,245

(22) Filed: Nov. 4, 2014

(51) Int. Cl.
*G02B 13/00* (2006.01)
*G02B 13/14* (2006.01)
*H04N 5/225* (2006.01)
*H04N 5/232* (2006.01)

(52) U.S. Cl.
CPC .......... *G02B 13/0075* (2013.01); *G02B 13/008* (2013.01); *G02B 13/009* (2013.01); *G02B 13/0015* (2013.01); *G02B 13/146* (2013.01); *H04N 5/2254* (2013.01); *H04N 5/23296* (2013.01)

(58) Field of Classification Search
CPC ........ G02B 26/00; G02B 13/009; G02B 3/14; G02F 1/29; G02F 1/00; H01L 27/14625; H04N 5/2254
USPC ............................ 359/290, 296; 348/345, 340
See application file for complete search history.

(56) References Cited

U.S. PATENT DOCUMENTS

| 5,751,471 | A | 5/1998 | Chen et al. | |
|---|---|---|---|---|
| 7,679,833 | B2* | 3/2010 | Kuiper | G02B 3/14 359/665 |
| 8,520,314 | B2* | 8/2013 | Yamamoto | G02B 3/14 359/666 |
| 2007/0097515 | A1* | 5/2007 | Jung | G02B 1/06 359/666 |
| 2008/0309835 | A1* | 12/2008 | Kuba | G02F 1/133526 349/1 |
| 2010/0231783 | A1* | 9/2010 | Bueler | G02B 3/14 348/347 |
| 2012/0013990 | A1* | 1/2012 | Yamamoto | G02B 3/14 359/666 |
| 2013/0044221 | A1 | 2/2013 | Vizgaitis | |

OTHER PUBLICATIONS

Ye, M., Wang, B., and Sato, S. "Liquid-crystal lens with a focal length that is variable in a wide range." Applied Optics, vol. 43, No. 35, pp. 6407-6412 (2004).

(Continued)

*Primary Examiner* — James Hannett
(74) *Attorney, Agent, or Firm* — Richard J. Kim

(57) ABSTRACT

An all-refractive optical system that images a scene at two different fields of view or FOVs, with switching between FOVs enabled by switchable lens elements is disclosed. The two fields of view vary in focal length by a factor of three. The wide FOV images broad-band Short Wave InfraRed SWIR radiation at an f/number of 1.7, while the narrow FOV images narrow-band illuminated SWIR at f/4.9. A voltage change across the switchable lens elements generates an optical power change between finite focus and infinite focus. Situated among static optical elements, the switching elements enable FOV changes with no mechanical movement. The given f/numbers at each FOV are a result of a fixed aperture in the system. The smaller throughput in the narrow FOV mode is augmented by narrow-band illumination of the scene to maintain equivalent sensor response between the two FOVs.

18 Claims, 8 Drawing Sheets

(56) References Cited

OTHER PUBLICATIONS

Li, L., Shi, L., Bryant, D., Van Heugten, T., Duston, D., and Bos, P. "Liquid crystal lenses: Liquid crystals promise compact lenses with variable focus." Laser Focus World, Dec. 2010, accessed online.

Valley, P., Reza Dodge, M., Schwiegerling, J., Peyman, G., Peyghambarian, N. "Nonmechanical bifocal zoom telescope" Optics Letters, vol. 35, No. 15, pp. 2582-2584 (2010).

Bagwell, B., Sweatt W., Wick, D. "Adaptive Optical Zoom Sensor." Sandia Report SAND2005-7208, Sandia National Laboratories, Nov. 2005.

Bagwell, B., Wick, D., Batchko, R., Mansell, J., Martinez, T., Restaino, S., Payne, D., Harriman, J., Serati, S., Sharp, G., Schwiegerling, J. "Liquid crystal based active optics" Proc. SPIE 6289, Novel Optical Systems Design and Optimization IX, 628908-1 (2006).

Oh, C. "Broadband Polarization Gratings for Efficient Liquid Crystal Display, Beam Steering, Spectropolarimetry, and Fresnel Zone Plate." PhD Dissertation, North Carolina State University, 2009.

Bayya, S., Sanghera, J., Kim W., Gibson, D., Fleet, E., Shaw, B., Hunt, M. and Aggarwal, I., "New Multiband IR Imaging Optics." Proc. SPIE 8704, Infrared Technology and Applications XXXIX, 870428 (2013).

\* cited by examiner

| Element Number | ROC (Front) | ROC (Back) | Thickness | Material | Aperture Diameter (Front) | Aperture Diameter (Back) |
|---|---|---|---|---|---|---|
| Object | Infinity | | Infinity | | | |
| 1 | Infinity | Infinity | 2.01 | Reconfigurable Element | 38.1 | 38.1 |
| | | | 4.00 | focal length: 233.03 mm; 4th order term: 4.548 waves @ 1.55um | | |
| 2 | 37.33 | 112.85 | 7.00 | ZnS | 33 | 29 |
| | | | 17.95 | | | |
| 3 | -56.55 | 33.23 | 4.00 | AMTIR-1 | 17 | 20 |
| | | | 17.74 | | | |
| 4 | 67.46 | -58.07 | 8.00 | ZnSe | 30 | 30 |
| | | | 6.00 | (front) k=0; A1=-4.07e-6; A2=-9.35e-10; A3=3.21e-12; A4=2.90e-15 | | |
| 5 | Infinity | Infinity | 2.01 | Reconfigurable Element | 25.4 | 25.4 |
| | | | 23.33 | focal length: -18.46 mm @ 1.55um | | |
| Image | Infinity | | | | | |

Figure 2

| Element Number | ROC (Front) | ROC (Back) | Thickness | Material | Aperture Diameter (Front) | Aperture Diameter (Back) |
|---|---|---|---|---|---|---|
| Object | Infinity | | Infinity | | | |
| 15 | Infinity | Infinity | 2.01 | Reconfigurable Element | 38.1 | 38.1 |
| | | | 4.00 | focal length: 243.86 mm; 4th order term: 2.757 waves @ 1.55um | | |
| 16 | 35.82 | 141.22 | 5.50 | MILTRAN | 33 | 29 |
| | | | 8.71 | (front) k=-0.34; A1=-4.77e-8; A2=-2.05e-9; A3=7.59e-12; A4=-1.21e-14 | | |
| 17 | 78.65 | 28.84 | 2.50 | NRL_4 | 22 | 19 |
| | | | 39.66 | | | |
| 18 | 97.31 | -74.69 | 5.00 | NRL_7 | 29 | 29 |
| | | | 6.00 | (front) k=10; A1=-2.32e-6; A2=2.57e-8; A3=-1.53e-10; A4=3.22e-13 | | |
| 19 | Infinity | Infinity | 2.01 | Reconfigurable Element | 25.4 | 25.4 |
| | | | 22.62 | focal length: -18.46 mm @ 1.55um | | |
| Image | Infinity | | | | | |

Figure 8

DUAL FIELD OF VIEW OPTICS WITH NON-MECHANICAL SWITCHING

GOVERNMENT INTEREST

The invention described herein may be manufactured, used, sold, imported, and/or licensed by or for the Government of the United States of America.

FIELD OF THE INVENTION

This invention relates in general to optics, and more particularly, to dual field of view optics.

BACKGROUND OF THE INVENTION

Smaller size and weight factor greatly into user selection for many handheld, head-mounted, or airborne imaging systems, even when the added weight or size can provide otherwise useful capabilities. The conventional means for field of view (FOV) switching generally requires more elements and/or longer optical paths over equivalent fixed FOV systems. As reconfigurable optic technologies are becoming more mature, switchable optic elements integrated with static optics can provide FOV switching capability in a smaller size and weight than a conventional zoom system. A variety of reconfigurable lenses are discussed in literature. Ye, et al. (2004) and Li, et al. (2010) give examples of two different types of Liquid Crystal (LC) lenses that vary the radial index profile of the LC material by changing the voltage across different electrode configurations. See, Ye et al., "Liquid-crystal lens with a focal length that is variable in a wide range." Applied Optics, Vol. 43, No. 35, pp. 6407-6412 (2004). See, also, Li et al., "Liquid crystal lenses: Liquid crystals promise compact lenses with variable focus." Laser Focus World, December 2010, accessible online. As long as the effects of diffraction are small, color dispersion is expected to be similar to that experienced by a conventional lens of the same optical power. Liquid Crystal Diffractive Lenses (LCDLs) are discussed in Valley, et al. (2010) and U.S. Pat. No. 5,751,471 to Chen, et al (1998). See, Valley et al., "Nonmechanical bifocal zoom telescope," Optics Letters, Vol. 35, No. 15, pp. 2582-2584 (2010). See, also, U.S. Pat. No. 5,751,471, entitled, "Switchable lens and method of making," issued May 12, 1998 to Chen et al. The color dispersion in LCDLs is much more pronounced.

Bagwell, et al. (2005 and 2006) describe several LC and non-LC reconfigurable elements assembled into non-mechanical zoom configurations, including one employing Liquid Crystal Diffractive Lenses (LCDLs). See, Bagwell et al., "Adaptive Optical Zoom Sensor," Sandia Report SAND2005-7208, Sandia National Laboratories, November 2005. See, also, Bagwell et al., "Liquid crystal based active optics," Proc. SPIE 6289, Novel Optical Systems Design and Optimization IX, 628908-1 (2006). From the above cited literature, two main challenges exist when integrating LCDLs into a zoom system, namely large color dispersion and sensor illumination changes with FOV.

SUMMARY OF THE INVENTION

The present disclosure has resolved these challenges and enables a dual FOV lens to be made using LCDLs. Specifically, an exemplary compact optical imager that can switch field of view (FOV) without mechanical motion is disclosed. Alternatively, an exemplary compact two field of view imager which uses switchable lenses to generate two different effective focal lengths for the system. Yet, in another aspect, an exemplary compact two field of view refractive imager is disclosed which uses the finite focus ("lens") and infinite focus ("clear") states of switchable lenses to alter the effective focal length of the imager such that two different f/numbers and FOVs are achieved. While the various exemplary solutions may have been developed for the particular case of LCDLs, it should be noted that the described exemplary solutions also encompass other reconfigurable elements that may be configured in the disclosed exemplary FOV switching systems.

An exemplary five-element (two reconfigurable and three static) imaging system is disclosed where the field of view is changed by switching the two reconfigurable elements between a finite focus ("lens") state and an infinite focus ("clear") state. The wide FOV images broad-band Short Wave InfraRed (SWIR) radiation at an f/number of 1.7, while the narrow FOV images narrow-band illuminated SWIR at f/4.9. The f/number in both cases is defined by a fixed aperture. The ratio of focal length change between the two FOVs is three. This results in an FOV change of the same ratio.

Two aspects of the present invention help to resolve the challenges encountered when implementing LCDLs in a FOV switching imager. First, the disclosed exemplary dual field of view system is configured such that the switchable diffractive elements are switchable between a "lens" state and a "clear" state. In the "clear" state, the LCDLs have no optical power and color dispersion is effectively zero. This state is designed into the wide FOV, such that suitable optical performance is achieved across the natural broad-band SWIR illumination in a scene. The five elements are configured to be well corrected for color dispersion in broad-band SWIR at the wide FOV setting. A second aspect of this invention that resolves much of the concern over high dispersion and low sensor illumination in the narrow FOV is that the system is configured to use a narrow-band illuminator on the scene at this FOV, in a manner similar to US Patent Application Publication US 2013/0044221 (Vizgaitis, 2011), incorporated herein by reference. See, U.S. Patent Application Publication No. US 2013/0044221 A1 by Vizgaitis, J, entitled, "Dual Field of View Multi-Band Optics," published Feb. 21, 2013. In the narrow FOV configuration, the LCDLs are in the "lens" state. Narrow-band illumination ensures that 1) the narrow-band signal overwhelms any broad-band signal that would otherwise be highly dispersed by the LCDLs and 2) the sensor has sufficient illumination to compensate for the smaller throughput at this larger f/number. This helps the narrow FOV illumination to be comparable to that of the larger throughput wide FOV.

BRIEF DESCRIPTION OF THE DRAWINGS

Additional advantages and features will become apparent as the subject invention becomes better understood by reference to the following detailed description when considered in conjunction with the accompanying drawings wherein:

FIG. 2 is a table of raytrace parameters for the exemplary five-element imager from FIGS. 1a and 1b.

FIG. 8 is a table of raytrace parameters for the five-element imager exemplified in FIGS. 7a and 7b.

DETAILED DESCRIPTION

Before entering into the detailed description of one embodiment of the present invention according to the accompanying Figure, the theory of the present invention will be explained hereinafter.

An exemplary five-lens imaging system is disclosed where the field of view is changed by electrically switching 1 and 5 between an infinite focus state and finite focus states. Electrically switchable lenses are separately described below with respect to FIGS. 3a-3c.

Figure 1A:
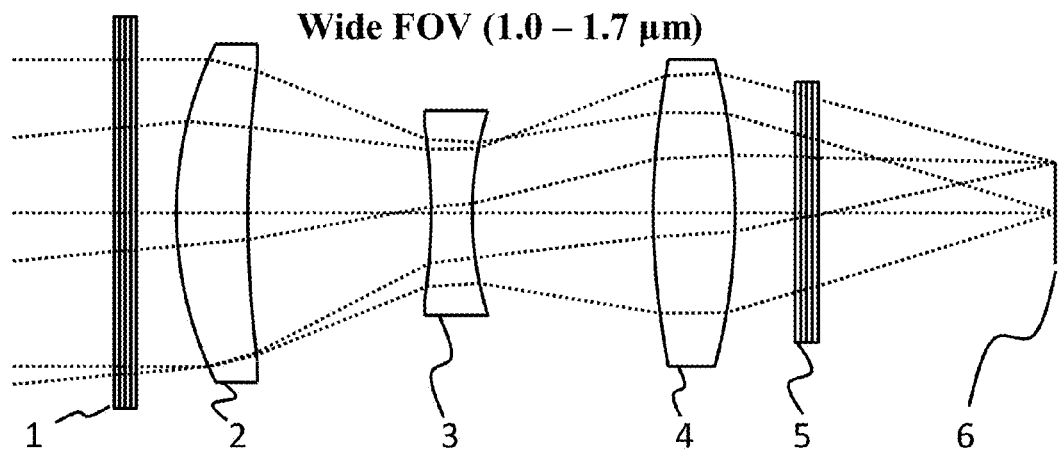
FIG. 1a shows an exemplary optical raytrace of the five-element imager in the (a) wide FOV with the rays traced for broad-band SWIR radiation.

In one aspect, Figure 1a shows an exemplary optical raytrace of the five-element imager in the wide FOV with the rays traced for broad-band SWIR radiation (e.g., of 1.0-1.7 μm). As tabulated in FIG. 2, both the front and back aperture diameters of an electrically switchable lens 1 can be 38.1 mm. The electrically switchable lens 1 is depicted in FIG. 1a as receiving wide FOV broadband rays (e.g., of 1.0-1.7 μm) on its front aperture. Lens 2 is configured as an exemplary meniscus lens with its front aperture facing the back aperture of the electrically switchable lens 1. The front aperture of lens 2 can have an aperture diameter of 33 mm and Radius of Curvature (ROC) of 37.33 mm, its back aperture having an aperture diameter of 29 mm and ROC of 112.85 mm. Further, the material composition of lens 2 can be based on ZnS. Lens 3 is configured as an exemplary negative lens with its front aperture facing the back aperture of lens 2. The front aperture of lens 3 can have an aperture diameter of 17 mm and ROC of −56.55 mm, its back aperture having an aperture diameter of 20 mm and ROC of 33.23 mm. Further, the material composition of lens 3 can be based on AMTIR-1. Lens 4 is configured as an exemplary positive lens with its front aperture facing the back aperture of lens 3. The front aperture of lens 4 can have an aperture diameter of 30 mm and ROC of 67.46 mm, its back aperture having an aperture diameter of 30 mm and ROC of −58.07 mm. Further, the material composition of lens 4 can be based on ZnSe. Electrically switchable lens 5 configured to face the back aperture of lens 4 can have both its front and back aperture diameters being 25.4 mm. Its front aperture is configured to face the back aperture of lens 4. The wide FOV of such an exemplary five-element imager as depicted in FIG. 1a can be achieved by electrically setting both electrically switchable lenses 1 and 5 in an infinite focus state. The infinite focus ("clear") state allows the lens elements to pass broad-band SWIR illumination, which when coupled with the achromatic configuration of lens 2 through lens 4 allows unfiltered light to be collected into a highly resolved image on an appropriate SWIR focal plane array 6.

Figure 1B:
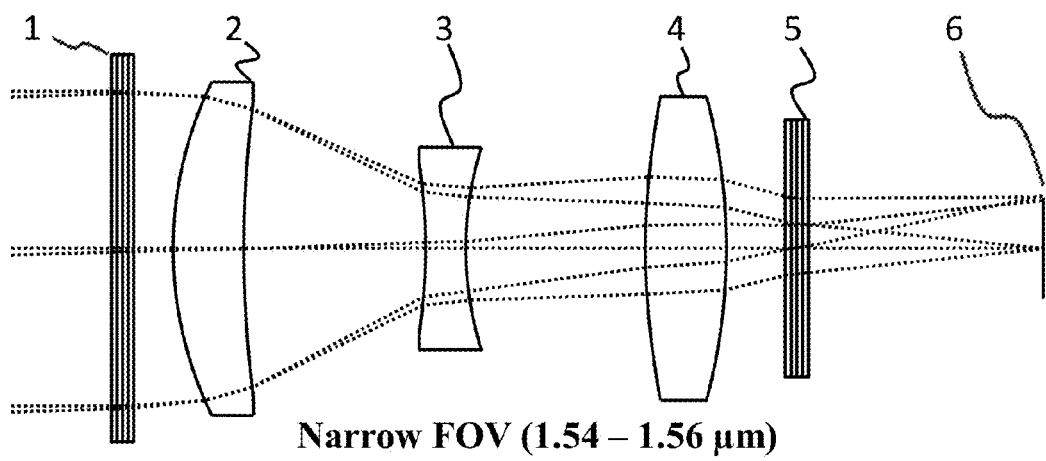
FIG. 1b shows an exemplary optical raytrace of the five-element imager in the narrow FOV with the rays traced for a narrow spectral band centered around 1.55 microns.

In another aspect, FIG. 1b shows an exemplary optical raytrace of the five-element imager in the narrow FOV with the rays traced for a narrow spectral band centered around 1.55 microns (e.g., 1.54-1.56 μm). As tabulated in FIG. 2, both the front and back aperture diameters of an electrically switchable lens 1 can be 38.1 mm. The electrically switchable lens 1 is depicted in FIG. 1b as receiving narrow FOV rays centered around 1.55 microns (e.g., 1.54-1.56 μm) on its front aperture. Lens 2 is configured as an exemplary meniscus lens with its front aperture facing the back aperture of the electrically switchable lens 1. The front aperture of lens 2 can have an aperture diameter of 33 mm and Radius of Curvature (ROC) of 37.33 mm, its back aperture having an aperture diameter of 29 mm and ROC of 112.85 mm. Further, the material composition of lens 2 can be based on ZnS. Lens 3 is configured as an exemplary negative lens with its front aperture facing the back aperture of lens 2. The front aperture of lens 3 can have an aperture diameter of 17 mm and ROC of −56.55 mm, its back aperture having an aperture diameter of 20 mm and ROC of 33.23 mm. Further, the material composition of lens 3 can be based on AMTIR-1. Lens 4 is configured as an exemplary positive lens with its front aperture facing the back aperture of lens 3. The front aperture of lens 4 can have an aperture diameter of 30 mm and ROC of 67.46 mm, its back aperture having an aperture diameter of 30 mm and ROC of −58.07 mm. Further, the material composition of lens 4 can be based on ZnSe. Electrically switchable lens 5 configured to face the back aperture of lens 4 can have both its front and back aperture diameters being 25.4 mm. The FOV change to the depicted narrow FOV of FIG. 1b occurs by electrically switching lens 1 to a state of positive-focus, and electrically switching lens 5 to a state of negative-focus towards an appropriate SWIR focal plane array 6. Active illumination of a narrow FOV scene helps to boost the total light energy collected at the focal plane array 6.

In the infinite focus ("clear") state (FIG. 1a), the elements pass broad-band SWIR illumination, which when coupled with the achromatic design of elements 2 through 4 allows unfiltered light to be collected into a highly resolved image on an appropriate SWIR focal plane array 6. The light throughput in this FOV is high, such that the imager operates in passive image collection mode. The FOV is switched to narrow mode (FIG. 1b) by changing the states of elements 1 and 5 to positive focus and negative focus, respectively. The focus states of these elements are highly dispersive with wavelength, and the optical performance of the imager depends on active illumination of the scene with a narrow-band illuminator, having a 20 nanometer bandwidth and center wavelength of 1.55 microns. The clear aperture of element 2 serves as a fixed system aperture, rendering a roughly 3× increase in f/number based on the 3× focal length increase when switching from wide FOV to narrow FOV. The active illumination of the narrow FOV scene helps the total light energy collected at 6 to match that collected in the wide FOV. Light throughput is also dependant on the transmission of the optical elements, which are designed to pass SWIR illumination from 1.0 to 1.7 microns. Zinc Sulfide, AMTIR 1, and Zinc Selenide are used for the static elements and suitable anti-reflection coatings are needed for high SWIR transmittance. The switching elements are also designed to transmit SWIR light.

FIG. 2 depicts exemplary raytrace parameters for the imager shown in FIG. 1. Lenses 2 and 3 are entirely made with spherical surfaces, the first surface of 2 being also used for the aperture stop. Lens 4 has a $10^{th}$ order even asphere on the front surface and a spherical surface on the back. The aspheric terms contribute to the lens sag (linear departure from the vertex plane) z:

$$z = \frac{r^2}{R + \sqrt{R^2 - (1+k)r^2}} + A_1 r^4 + A_2 r^6 + A_3 r^8 + A_4 r^{10},$$

where r is the radial distance from the vertex, R is the radius of curvature, k is the conic constant, and $A_n$ indicates aspheric coefficients. The asphere helps to correct spherical aberration and coma that would otherwise render the image at 6 highly aberrated. The full aperture of elements 4 and 5 is only used in the wide FOV, as the narrow FOV requires a much longer system focal length and thus the rays have a much smaller footprint on these last two elements. The smaller footprint on 5 for the narrow FOV also means that any patterning used to generate the lens state for that element need only extend as far as the smaller footprint requires. The remaining aperture can be clear, as this is the state element 5 will be using in the wide FOV (full aperture).

Figure 3A:
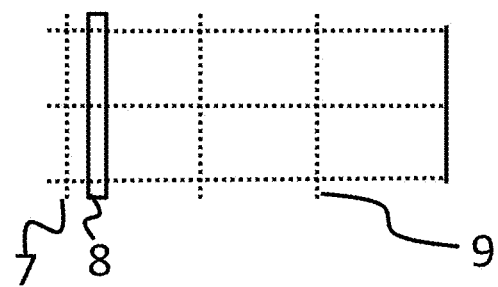
FIG. 3a illustrates an exemplary infinite focus state for switchable lenses, wherein the infinite focus state imparts a radially uniform phase, such that the passing wavefront maintains its original form.
Figure 3B:
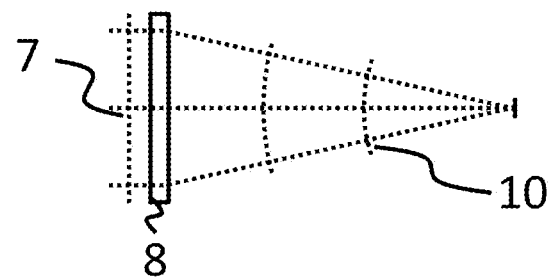
FIG. 3b illustrates an exemplary positive focus state for switchable lenses, wherein the positive focus state impose a radially varying phase change on the light passing through the lens, creating curvature to the initially flat optical wavefront.
Figure 3C:
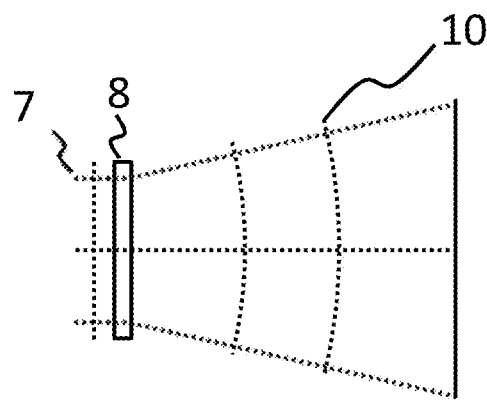
FIG. 3c illustrates an exemplary negative focus state for switchable lenses, wherein the negative focus state also imposes a radially varying phase change on the light passing through the lens, creating curvature to the initially flat optical wavefront, whereby the resulting wavefront curvature is opposite in sign to that shown in FIG. 3b.

FIGS. 3a-3c variously illustrate three exemplary states of focus for switchable lenses: FIG. 3a illustrates an exemplary infinite focus state; FIG. 3b illustrates an exemplary positive focus state; and FIG. 3c illustrates an exemplary negative focus state. The positive and negative focus states impose a radially varying phase change on the light passing through the lens, applying curvature to the initially flat optical wavefront. The infinite focus state imparts a radially uniform phase, such that the passing wavefront maintains its original form. The states of a switchable lens (e.g., FIGS. 3a-3c) enable the FOV change in the exemplary imager shown in FIGS. 1a and 1b. A wavefront of light, shown in this case as a plane wave 7, enters the switchable lens 8 and either passes through unchanged 9 or changes 10 curvature, based on whether the lens is infinite focus (FIG. 3a), positive focus (FIG. 3b), or negative focus (FIG. 3c).

Figure 4:
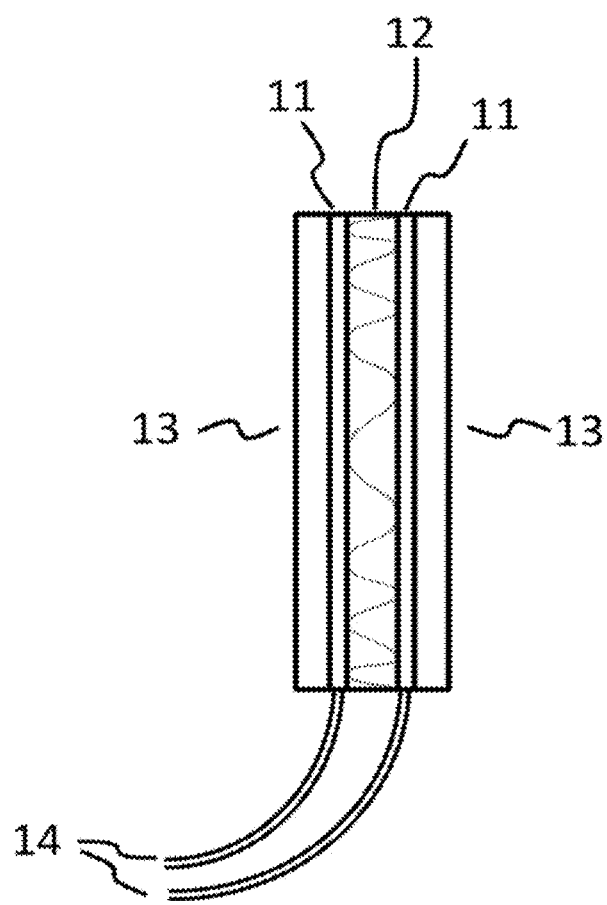
FIG. 4 illustrates a side profile view of an exemplary electronically switchable lens made from a liquid crystal cell.

A common procedure for generating a switchable lens is to write a holographic image of the desired lens power into the photosensitive layer of an LC cell. FIG. 4 illustrates a side profile view of an exemplary electronically switchable lens generated by a holographic technique. An LC material 12 is suspended in a glass cell 13 that is highly transparent to light. The inside walls of the cell 11 are coated with a transparent electrode, such that an electrical signal applied to wires 14 generates an electric field across the LC material 12. The holographic pattern that constitutes a lens phase distribution resides in the LC material layer 12. The lens pattern thus recorded is a periodic phase profile, whose amplitude is controlled by applying a voltage signal across the LC cell. Light passing through the LCDL will undergo deformation of its wavefront according to this phase profile. A special subset of LCDLs using concentric polarization gratings (Oh, 2009) is constructed to switch between two possible states: clear (FIG. 3a) and a superposition of both lens states (FIGS. 3b-c). Oh, C., "Broadband Polarization Gratings for Efficient Liquid Crystal Display, Beam Steering, Spectropolarimetry, and Fresnel Zone Plate." PhD Dissertation, North Carolina State University, 2009 is hereby incorporated by reference. In the lens state, a polarizer is used to select between positive focus and negative focus with high efficiency.

Figure 5A:
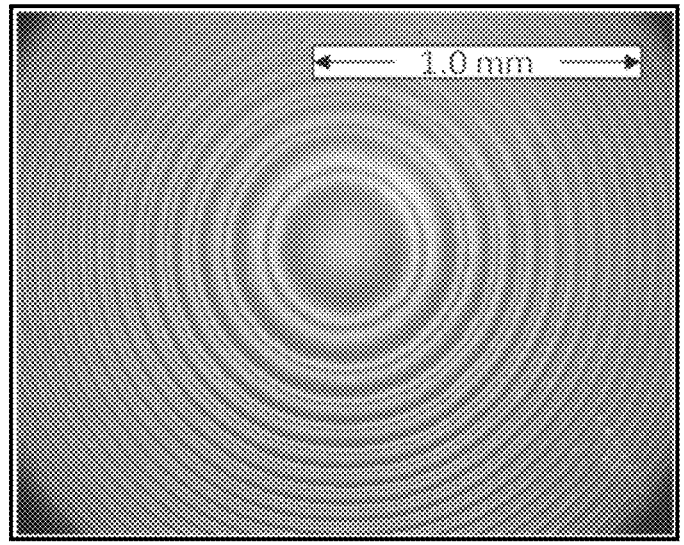
FIG. 5a shows a microscope image of an exemplary electronically switchable lens generated in a liquid crystal cell, wherein the microscope image was captured while the element was in the "lens" state with no voltage applied to the element.
Figure 5B:
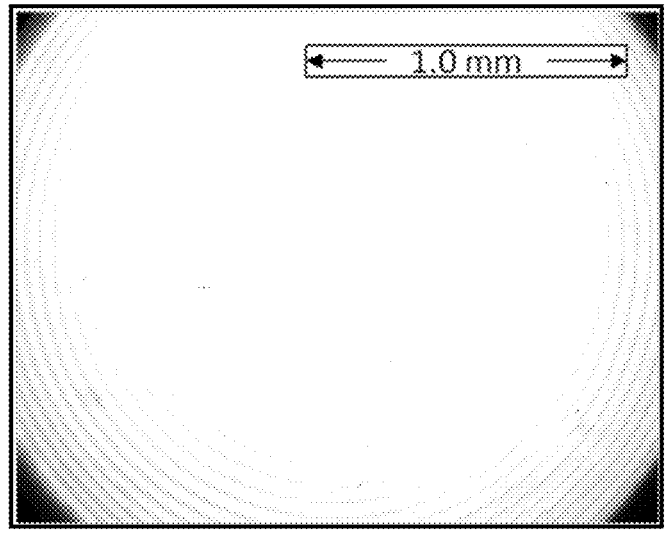
FIG. 5b shows a microscope image of an exemplary electronically switchable lens generated in a liquid crystal cell, wherein the microscope image was captured while the element was in the "clear" state as a result of applying a voltage signal.

FIGS. 5a and 5b show microscope images of an exemplary electronically switchable lens generated with the above referenced technique. FIG. 5a was captured while the element was in the lens state with no voltage applied to the element. In the lens state, the concentric rings characteristic of a lens holographic diffraction pattern can be seen in the image. FIG. 5b shows the element switched to the clear state as a result of applying a 3.0 volt peak to peak square wave oscillating at 2 kilohertz to the LC cell wires 14. In the clear state, the diffraction pattern clears and the illumination from the microscope backlighting is seen in the image. Both microscope images are taken through parallel polarizers with a narrow-band SWIR filter centered on 1.55 μm.

Figure 6A:
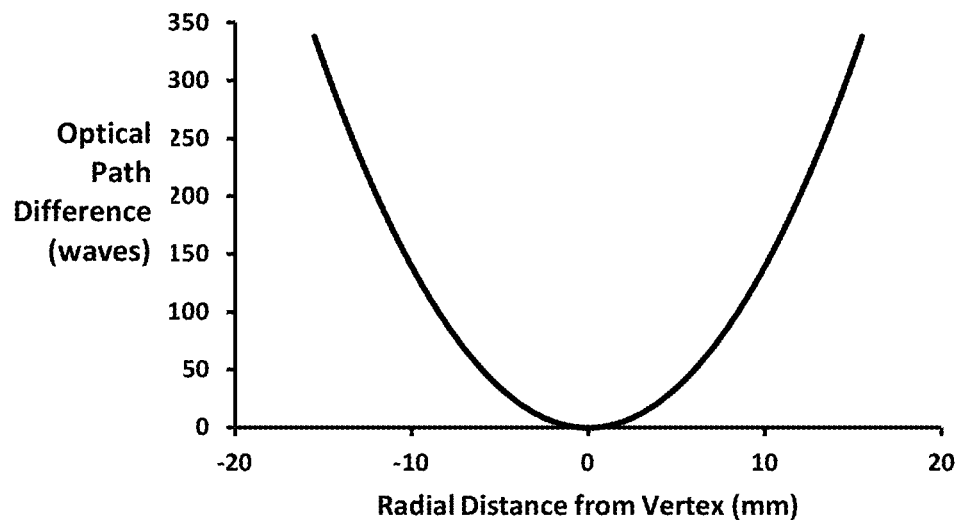
FIG. 6a illustrates an exemplary total Optical Path Difference (OPD) over a full aperture, wherein the OPD is measured in optical waves and indicates departure from a plane (flat) wavefront.
Figure 6B:
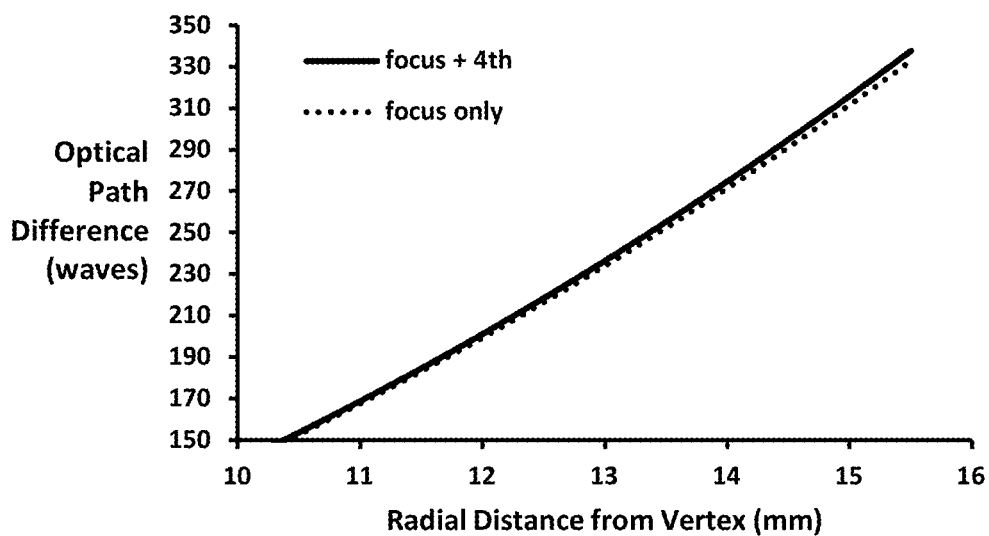
FIG. 6b illustrates an exemplary close-up view of the Optical Path Difference (OPD) near the edge of an aperture showing the difference between the total OPD (focus and 4th order aspheric term) and the contribution by the focus term alone.

FIGS. 6a and 6b illustrate the Optical Path Difference (OPD) imposed by element 1 in the positive focus state. The OPD is measured in optical waves and indicates departure from a plane (flat) wavefront. Specifically, the total OPD over the full exemplary aperture is shown in FIG. 6a, whereas FIG. 6b illustrates an exemplary close-up view of the OPD near the edge of the aperture showing the difference between the total OPD (focus and 4th order aspheric term) and the contribution by the focus term alone.

The positive-focus state of element 1 in the above exemplary embodiment imposes a radial profile to the wavefront described in FIGS. 6a and 6b as the Optical Path Difference (OPD) from a plane wave. The curvature of the OPD increases with distance from the vertex of the element. The effective focal length of this element is 233.03 millimeters at a design wavelength of 1.55 microns. This particular element was designed not only to have positive optical power in the lens state, but it also imparts small amounts of additional OPD (as seen in FIG. 6b) as a $4^{th}$ order correction to what would otherwise be spherical aberration at the image. The amount of $4^{th}$ order correction is 4.548 waves at 1.55 microns. Element 5 is designed to have a focal length of 18.46 millimeters at 1.55 microns, and there is no $4^{th}$ order term. Negative focus is selected for element 5 when in the lens state.

Figure 7A:
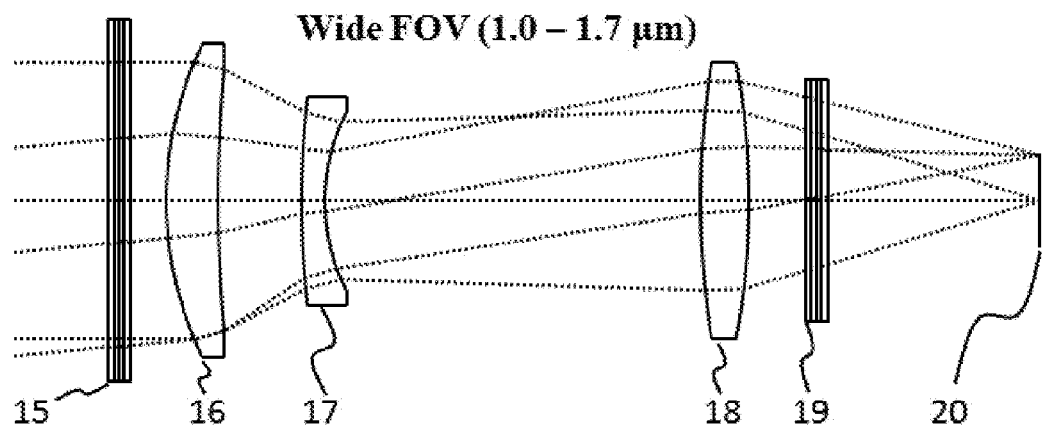
FIG. 7a illustrates an exemplary wide FOV optical raytrace for an alternate exemplary embodiment using alternate materials.
Figure 7B:
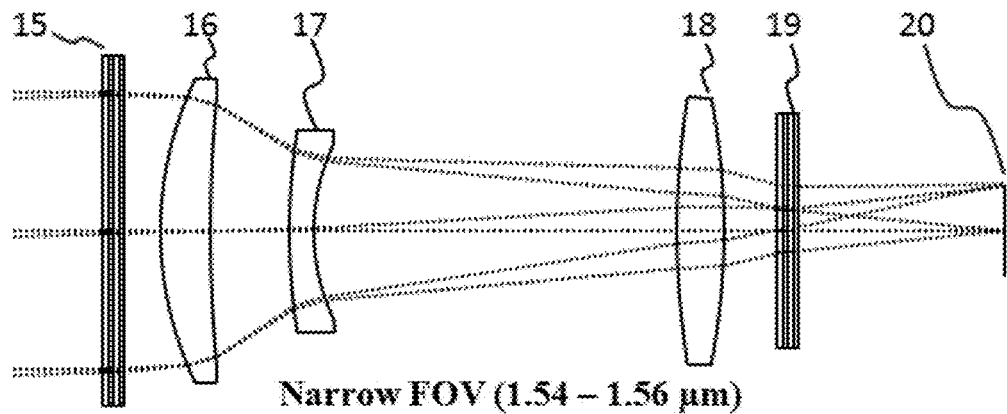
FIG. 7b illustrates an exemplary narrow FOV optical raytrace for an alternate exemplary embodiment using alternate materials.

An alternate exemplary embodiment for this invention is shown in FIGS. 7a and 7b. Specifically, the figures illustrate the optical raytrace of an alternate embodiment of the invention using alternate materials. Electrically switchable lenses have been separately described above with respect to FIGS. 3a-3c, 4, and 5a-5b.

In one aspect of the alternate exemplary embodiment, FIG. 7a shows an exemplary optical raytrace of the alternate five-element imager in the wide FOV with the rays traced for broad-band SWIR radiation (e.g., of 1.0-1.7 μm). As tabulated in FIG. 8, both the front and back aperture diameters of an electrically switchable lens 15 can be 38.1 mm. The electrically switchable lens 15 is depicted in FIG. 7a as receiving wide FOV broadband rays (e.g., of 1.0-1.7 μm) on its front aperture. Lens 16 is configured as an exemplary meniscus lens with its front aperture facing the back aperture of the electrically switchable lens 15. The front aperture of lens 16 can have an aperture diameter of 33 mm and Radius of Curvature (ROC) of 35.82 mm, its back aperture having an aperture diameter of 29 mm and ROC of 141.22 mm. Lens 17 is configured with its front aperture facing the back aperture of lens 16. The front aperture of lens 17 can have an aperture diameter of 22 mm and ROC of 78.65 mm, its back aperture having an aperture diameter of 19 mm and ROC of 20.84 mm. Lens 18 is configured with its front aperture facing the back aperture of lens 17. The front aperture of lens 18 can have an aperture diameter of 29 mm and ROC of 97.31 mm, its back aperture having an aperture diameter of 29 mm and ROC of −74.69 mm. Electrically switchable lens 19 can have both its front and back aperture diameters of 25.4 mm. Its front aperture is configured to face the back aperture of lens 18. The wide FOV of such an exemplary five-element imager as depicted in FIG. 7a can be achieved by electrically setting both electrically switchable lenses 15 and 19 in an infinite focus state. The infinite focus ("clear") state allows the lens elements to pass broad-band SWIR illumination, which when coupled with the achromatic configuration of lens 16 through lens 18 allows unfiltered light to be collected into a highly resolved image on an appropriate SWIR focal plane array 20.

In another aspect of the alternate exemplary embodiment, FIG. 7b shows an exemplary optical raytrace of the alternate five-element imager in the narrow FOV with the rays traced for a narrow spectral band centered around 1.55 microns (e.g., 1.54-1.56 µm). As tabulated in FIG. 8, both the front and back aperture diameters of an electrically switchable lens 15 can be 38.1 mm. The electrically switchable lens 15 is depicted in FIG. 7b as receiving a narrow spectral band centered around 1.55 microns (e.g., 1.54-1.56 µm) on its front aperture. Lens 16 is configured as an exemplary meniscus lens with its front aperture facing the back aperture of the electrically switchable lens 15. The front aperture of lens 16 can have an aperture diameter of 33 mm and Radius of Curvature (ROC) of 35.82 mm, its back aperture having an aperture diameter of 29 mm and ROC of 141.22 mm. Lens 17 is configured with its front aperture facing the back aperture of lens 16. The front aperture of lens 17 can have an aperture diameter of 22 mm and ROC of 78.65 mm, its back aperture having an aperture diameter of 19 mm and ROC of 20.84 mm. Lens 18 is configured with its front aperture facing the back aperture of lens 17. The front aperture of lens 18 can have an aperture diameter of 29 mm and ROC of 97.31 mm, its back aperture having an aperture diameter of 29 mm and ROC of −74.69 mm. Electrically switchable lens 19 can have both its front and back aperture diameters of 25.4 mm. Its front aperture is configured to face the back aperture of lens 18. The FOV change to the depicted narrow FOV of FIG. 7b occurs by electrically switching lens 15 to a state of positive-focus, and electrically switching lens 19 to a state of negative-focus towards an appropriate SWIR focal plane array 20. An active illumination of a narrow FOV scene helps to boost the total light energy collected at the focal plane array 20.

Like the exemplary embodiment described in FIGS. 1a and 1b, the alternate exemplary imager (e.g., of FIGS. 7a and 7b) is comprised of five elements, with elements 15 and 19 being switchable lenses and elements 16 through 18 being static optics. FIG. 8 is a table that shows the exemplary raytrace parameters and switchable lens specifications used in this alternate exemplary embodiment. Switchable element 19 is identical to 5, and element 15 differs only slightly from 1. The effective focal length of element 15 is 243.86 millimeters at a design wavelength of 1.55 microns. The amount of its $4^{th}$ order correction is 2.757 waves at 1.55 microns.

The static optics for the alternate exemplary embodiment are based on glass and ceramic materials developed by Naval Research Laboratories (Bayya, et al., 2013). See, Bayya et al., "New Multiband IR Imaging Optics," Proc. SPIE 8704, Infrared Technology and Applications)XXXIX, 870428 (2013), incorporated herein by reference. These materials are more amenable to molding than are crystalline materials, which may be an attractive economic consideration. Lens 16 has a conic term and a $10^{th}$ order even asphere on the front surface and a spherical surface on the back. The front surface of 16 is also used for the aperture stop. Lens 16 is made of Miltran ceramic. Lens 17 is made of NRL 4 glass and has only spherical surfaces. Lens 18 has a conic and a $10^{th}$ order even asphere on the front surface and a spherical surface on the back. NRL 7 glass is used for this element. By comparison to the exemplary embodiment in FIGS. 1a and 1b, the alternate exemplary embodiment illustrated in FIGS. 7a and 7b uses two aspheric surfaces (instead of one), but the NRL materials do not need to be as thick, saving on overall weight. Aside from these noted differences, the functional description of this alternate exemplary embodiment is the same as described for that in FIG. 1.

It is obvious that many modifications and variations of the present invention are possible in light of the above teachings. It is therefore to be understood that within the scope of the appended claims, the invention may be practiced otherwise than as described.

What is claimed is:

1. A compact optical imager that can switch field of view without mechanical motion, comprising:
   a first electrically switchable lens capable of receiving either wide broadband or narrow spectral band rays on its front aperture;
   a meniscus lens with its front aperture facing a back aperture of the electrically switchable lens;
   a negative lens with its front aperture facing a back aperture of the meniscus lens;
   a positive lens with its front aperture facing a back aperture of the negative lens;
   a second electrically switchable lens configured to face a back aperture of the positive lens; and
   an SWIR focal plane array configured to receive a focused image from the second electrically switchable lens.

2. The compact optical imager according to claim 1, wherein the meniscus lens is based on ZnS, the front aperture of the meniscus lens having an aperture diameter of 33 mm and a radius of curvature 37.33 mm, and the back aperture having an aperture diameter of 29 mm and a radius of curvature of 112.85 mm.

3. The compact optical imager according to claim 1, wherein the negative lens is based on AMTIR-1, the front aperture of the negative lens having an aperture diameter of 17 mm and a radius of curvature of −56.55 mm, the back aperture having an aperture diameter of 20 mm and ROC of 33.23 mm.

4. The compact optical imager according to claim 1, wherein the positive lens is based on ZnSe, the front aperture of the positive lens 4 having an aperture diameter of 30 mm and a radius of curvature of 67.46 mm, its back aperture having an aperture diameter of 30 mm and a radius of curvature of −58.07 mm.

5. The compact optical imager according to claim 1, wherein a front aperture of the second electrically switchable lens faces the back aperture of the positive lens, both the front and back aperture diameters of the second electrically switchable lens being 25.4 mm.

6. The compact optical imager according to claim 1, wherein for broad-band SWIR radiation of 1.0-1.7 µm, both the first and the second electrically switchable lenses are electrically set in an infinite focus state to resolve a wide FOV image onto the SWIR focal plane array.

7. The compact optical imager according to claim 1, wherein for a narrow spectral band radiation centered around 1.54-1.56 µm, the first electrically switchable lens is set to a state of positive-focus, and the second electrically switchable lens is set to a state of negative-focus, to focus a narrow FOV image onto the SWIR focal plane array.

8. The compact optical imager according to claim 7, wherein active illumination of a scene boosts total light energy collected at the focal plane array.

9. The compact optical imager according to claim 1, wherein finite focus and infinite focus electrically switchable states of the first and second electrically switchable lenses are used to alter an effective focal length of the compact optical imager such that wide FOV images broad-band short wave infrared radiation at an f/number of 1.7, while the narrow FOV images narrow-band illuminated short wave infrared radiation at f/4.9.

10. A compact two field of view imager which uses switchable lenses to generate two different effective focal lengths for the system, comprising:
a first electrically switchable lens capable of receiving either wide broadband or narrow spectral band rays on its front aperture;
a ceramic lens with its front surface having a conic term and a 10th order even asphere facing a back aperture of the electrically switchable lens as an aperture stop;
a first glass lens with its front spherical surface facing a spherical back surface of the ceramic lens;
a second glass lens with its front surface having a conic and a 10th order even asphere facing a spherical back surface of the first glass lens;
a second electrically switchable lens configured to face a spherical back surface of the second glass lens; and
an SWIR focal plane array configured to receive a focused image from the second electrically switchable lens.

11. The compact two field of view imager according to claim 10, wherein the ceramic lens is based on a miltran ceramic, its front aperture having an aperture diameter of 33 mm and a radius of curvature 35.82 mm, and its back aperture having an aperture diameter of 29 mm and a radius of curvature of 141.22 mm.

12. The compact two field of view imager according to claim 10, wherein the first glass lens is based on NRL 4 glass, its front aperture having an aperture diameter of 22 mm and a radius of curvature of 78.65 mm, its back aperture having an aperture diameter of 19 mm and ROC of 20.84 mm.

13. The compact two field of view imager according to claim 10, wherein the second glass lens is based on NRL 7 glass, its front aperture having an aperture diameter of 29 mm and a radius of curvature of 97.31 mm, its back aperture having an aperture diameter of 29 mm and a radius of curvature of −74.69 mm.

14. The compact two field of view imager according to claim 10, wherein a front aperture of the second electrically switchable lens faces the back aperture of the second glass lens, both the front and back aperture diameters of the first electrically switchable lens being 38.1 mm, and both the front and back aperture diameters of the second electrical switchable lens being 25.4 mm.

15. The compact two field of view imager according to claim 10, wherein for broad-band SWIR radiation of 1.0-1.7 µm, both the first and the second electrically switchable lenses are electrically set in an infinite focus state to resolve a wide FOV image onto the SWIR focal plane array.

16. The compact two field of view imager according to claim 10, wherein for a narrow spectral band radiation centered around 1.54-1.56 µm, the first electrically switchable lens is set to a state of positive-focus, and the second electrically switchable lens is set to a state of negative-focus, to focus a narrow FOV image onto the SWIR focal plane array.

17. The compact two field of view imager according to claim 16, wherein active illumination of a scene boosts total light energy collected at the focal plane array.

18. The compact two field of view imager according to claim 10, wherein finite focus and infinite focus electrically switchable states of the first and second electrically switchable lenses are used to alter an effective focal length of the compact two field of view imager such that two different f/numbers and FOVs are achievable.

\* \* \* \* \*